United States Patent
Mathias et al.

(10) Patent No.: US 10,005,027 B2
(45) Date of Patent: Jun. 26, 2018

(54) METHODS AND SYSTEMS FOR IMPROVING THE ENERGY EFFICIENCY OF CARBON DIOXIDE CAPTURE

(71) Applicant: Fluor Technologies Corporation, Sugar Land, TX (US)

(72) Inventors: Paul M. Mathias, Aliso Viejo, CA (US); Satish Reddy, Laguna Beach, CA (US)

(73) Assignee: Fluor Technologies Corporation, Sugar Land, TX (US)

( * ) Notice: Subject to any disclaimer, the term of this patent is extended or adjusted under 35 U.S.C. 154(b) by 102 days.

(21) Appl. No.: 15/008,964

(22) Filed: Jan. 28, 2016

(65) Prior Publication Data

US 2016/0214057 A1    Jul. 28, 2016

Related U.S. Application Data

(60) Provisional application No. 62/108,926, filed on Jan. 28, 2015.

(51) Int. Cl.
*B01D 53/96* (2006.01)
*B01D 53/14* (2006.01)
(Continued)

(52) U.S. Cl.
CPC ......... *B01D 53/62* (2013.01); *B01D 53/1493* (2013.01); *B01D 53/78* (2013.01);
(Continued)

(58) Field of Classification Search
None
See application file for complete search history.

(56) References Cited

U.S. PATENT DOCUMENTS 4,152,217 A * 5/1979 Eisenberg .......... B01D 53/1425
203/2
5,738,834 A     4/1998 Deberry
(Continued)

FOREIGN PATENT DOCUMENTS

CA    2760784 A1    10/2010
FR    2909010 B1    11/2006
(Continued)

OTHER PUBLICATIONS

PCT/US2016/015349, International Search Report and Written Opinion, dated May 19, 2016, 11 pages.
(Continued)

*Primary Examiner* — Daniel Berns
(74) *Attorney, Agent, or Firm* — Conley Rose, P.C.

(57) ABSTRACT

A system for carbon dioxide capture from a gas mixture comprises an absorber that receives a lean solvent system stream (containing a chemical solvent, physical-solvent additive, and water) from the stripper, a stripper that receives the rich solvent stream from the absorber and produces the product carbon dioxide and the lean solvent through the use of a reboiler in fluid communication with a lower portion of the stripper, a condenser in fluid communication with a vapor outlet of the stripper, a cross-exchanger in fluid communication with a rich solvent system outlet from the absorber and a rich solvent system inlet on the stripper, and a splitter. The splitter is configured to separate the rich solvent system stream into a first portion and a second portion, where the first portion directly passes to the stripper and the second portion passes through the cross-exchanger prior to passing to the stripper.

19 Claims, 6 Drawing Sheets

(51) Int. Cl.
    *B01D 53/62*    (2006.01)
    *B01D 53/78*    (2006.01)
(52) U.S. Cl.
    CPC ............... *B01D 2252/2026* (2013.01); *B01D 2252/20484* (2013.01); *Y02A 50/2342* (2018.01); *Y02C 10/04* (2013.01); *Y02C 10/06* (2013.01)

(56) References Cited

U.S. PATENT DOCUMENTS

| | | |
|---|---|---|
| 2005/0166756 A1 | 8/2005 | Brok et al. |
| 2010/0062926 A1* | 3/2010 | Woodhouse ....... B01D 53/1425 502/55 |
| 2010/0263534 A1 | 10/2010 | Chuang |
| 2012/0090466 A1 | 4/2012 | Versteeg et al. |
| 2014/0121967 A1 | 8/2014 | Kabushiki |
| 2014/0363347 A1 | 12/2014 | Baburao et al. |

FOREIGN PATENT DOCUMENTS

| | | |
|---|---|---|
| JP | 2012504047 A | 2/2012 |
| WO | 2011147033 A2 | 12/2011 |
| WO | 2012092191 A2 | 7/2012 |
| WO | 2014118633 A2 | 8/2014 |

OTHER PUBLICATIONS

Bao, D et al., "Numerical simulations of bubble behavior and mass transfer in CO2 capture system with ionic liquids", Chem. Eng. Sci., 2015, 13 pages, http://dx.doi.org/10.1016/j.ces.2015.06.035i.

Zhang, X.P. et al., "Carbon capture with ionic liquids: overview and progress", Energy Environ. Sci., 2012. 5: pp. 6668-6681.

Huang, Y. et al., "A New Fragment Contribution-Corresponding States Method for Physicochemical Properties Prediction of Ionic Liquids", AIChE Journal, Apr. 2013, vol. 59, No. 4, pp. 1348-1359.

* cited by examiner

METHODS AND SYSTEMS FOR IMPROVING THE ENERGY EFFICIENCY OF CARBON DIOXIDE CAPTURE

CROSS-REFERENCE TO RELATED APPLICATIONS

This application claims priority to U.S. Provisional Patent Application No. 62/108,926 filed on Jan. 28, 2015 to Mathias et al., and entitled 'Methods and Compositions to Improve the Energy Efficiency of Carbon Dioxide Capture by Chemical Solvents," which is incorporated herein by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Carbon dioxide ($CO_2$) is a greenhouse gas that, as a byproduct of combustion and a wide variety of industrial processes, is subject to increasing regulation. As a result, there is a significant interest in efficient methods for capture $CO_2$ from such gas mixtures. Such methods are often designed to capture $CO_2$, at low pressure (for example, from flue gas), and typically are energy intensive. In traditional processes, an aqueous chemical solvent (typically an aqueous solution of MEA, AMP, and/or piperazine) is utilized in an absorber to absorb $CO_2$ in the form of chemical complexes with the solvent species and water, generating a rich solvent. A stripper is utilized to release $CO_2$ from the rich solvent through the application of heat, to produce a lean solvent. In such processes a cross exchanger is utilized to improve efficiency by exchanging heat from the lean solvent into the rich solvent. The net heat that is added to the process is referred to as the stripper duty or heat rate. This heat rate not only represents a considerable expense, the production of the necessary heat (for example, steam production) can result in the generation of additional $CO_2$ and/or reduction of the output (for example, electricity) of the plant.

Thus, there is still a need for methods and compositions that reduce the costs associated with chemical solvent-based $CO_2$ capture.

SUMMARY

In an embodiment, a solvent system for capture of carbon dioxide from a gas mixture comprises a chemical solvent in a concentration ranging from 20 wt % to 50 wt %, a nonaqueous physical solvent, and water. A molar ratio of the nonaqueous physical solvent to the chemical solvent can be between about 0.01 to 0.7.

In an embodiment, a method for capturing carbon dioxide from a gas mixture comprises contacting a gaseous stream comprising carbon dioxide with a lean solvent system, absorbing at least a portion of the carbon dioxide in the lean solvent system to produce a rich solvent system, transferring the rich solvent system to a stripper, where the stripper comprises a reboiler, applying heat to the rich solvent system using the reboiler, generating a vapor stream within the reboiler while incurring a heat rate to regenerate the lean solvent system, and transferring the vapor stream to a condenser. The solvent system comprises a chemical solvent, a physical solvent, and water. The vapor stream comprises steam and at least a portion of the carbon dioxide from the rich solvent system.

In an embodiment, a system for carbon dioxide capture from a gas mixture comprises an absorber, a stripper, a cross-exchanger in fluid communication with a rich solvent system outlet on the absorber and a rich solvent system inlet on the stripper, a splitter, a reboiler in fluid communication with a lower portion of the stripper, and a condenser in fluid communication with a vapor outlet of the stripper. The absorber is configured to receive a lean solvent system and gaseous stream comprising carbon dioxide, contact the lean solvent system with the gaseous stream, and produce a rich solvent system stream and a gaseous stream depleted in carbon dioxide. The stripper is configured to receive the rich solvent system. The splitter is configured to separate the rich solvent system stream into a first portion and a second portion, and the splitter is configured to direct the first portion directly to the stripper and the second portion through the cross-exchanger prior to passing to the stripper. The reboiler is configured to generate a vapor stream from the rich solvent system and pass the vapor stream back to the stripper.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
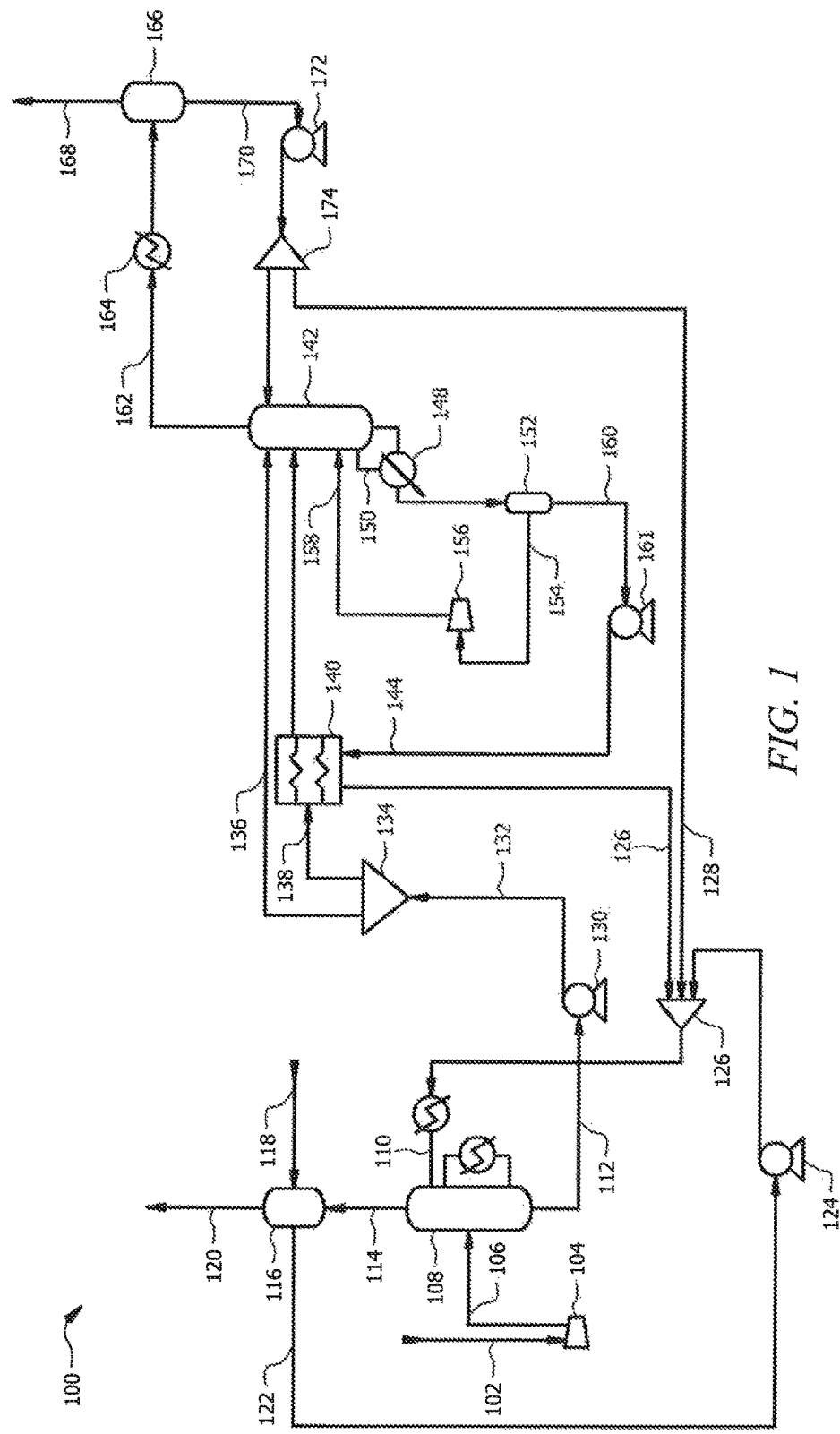
FIG. 1 is a schematic illustration of an embodiment of a carbon dioxide capture system according to an embodiment.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Disclosed herein are apparatus, systems, and methods in which a high dielectric physical solvent replaces at least part of the water in a solvent system that includes a chemical solvent (for example, an alkanolamine) to reduce the total heat rate of an absorption-stripping process utilized in the capture of carbon dioxide. Such a physical solvent for $CO_2$ can act in concert with and complement the activity of chemical solvents such as alkanolamines.

Various objects, features, aspects and advantages of the inventive subject matter will become more apparent from the following detailed description of preferred embodiments, along with the accompanying drawing figures in which like numerals represent like components. The following description includes information that may be useful in understanding the present invention. It is not an admission that any of the information provided herein is prior art or relevant to the presently claimed invention, or that any publication specifically or implicitly referenced is prior art.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

As discussed herein, the heat rate in a carbon dioxide capture process can be reduced using a modified solvent system and/or through the use of process modifications in the carbon dioxide removal system. In an embodiment, the heat rate of the carbon dioxide capture process can be reduced by modifying the conventional chemical solvents and solvent systems through the addition of physical solvents in the form of inert compounds that can have high dielectric constants. It should be appreciated that the addition of a physical solvent can actually hinder the ionization of the chemical solvent. Surprisingly, the use of high-dielectric solvents can minimize the hindrance and can also facilitate the ionization if the dielectric constant is sufficiently high (for example, higher than water).

Various process configurations can be used to take advantage of the modified solvent system, though the process configurations can be used with an existing solvent system to lower the overall heat rate consumed in the process. In an embodiment, a carbon dioxide system can generally comprise an absorber for contacting a lean solvent system with a flue gas to absorb carbon dioxide. The rich solvent system can then pass to a stripper where the carbon dioxide can be released from the rich solvent to regenerate the lean solvent. In an embodiment, the rich solvent from the absorber can be split into two portions. The first portion may bypass a cross-exchanger and pass directly to the stripper at a point above the hotter second portion that passes through a cross-exchanger prior to entering the stripper. The use of the split stream can reduce the amount of water vapor passing to the condenser and thereby lower the condenser duty. The system can also use a lean vapor compressor to compress the vapor passing back to the stripper. In addition, an intercooler can be used to cool the solvent in the absorber. All of these improvements can reduce the overall energy consumption in the system. Further, the use of the modified solvent system comprising the physical solvent may allow the solvent system to have an improved absorption capacity for carbon dioxide, which may further improve the efficiency of the system.

The main value of the solvent additive is to reduce the energy associated with the vaporization of steam. Although not wishing to be bound by theory, the addition of a physical solvent as described herein is believed to facilitate the ionization of the chemical solvent. Such additives can be far less volatile than the chemical solvent, thereby reducing their losses during the process.

There are three primary contributors to the total heat rate within a carbon dioxide capture process. The first is the heat required to release $CO_2$ from the rich solvent. This heat is supplied to reverse the carbon dioxide absorption reaction with the chemical solvent and is strongly related to the heat of absorption of carbon dioxide. A second contributor to the total heat rate is heat loss by the system (for example, heat losses due to finite temperature approaches in the cross exchanger, etc.). This can be reduced by proper system design. A third contributor of the heat of vaporization related to creating steam in the stripper in order to strip carbon dioxide from the rich solvent. Embodiments of the system described herein are directed to reducing the fraction of the total heat rate that results from the heat of vaporization involved in producing steam in the stripper.

The heat required to release $CO_2$ from the rich solvent can account for approximately two thirds of the heat rate demands of the system, the heat that is lost due to system heat losses can account for approximately 10-20% of the heat rate, and the heat of vaporization used for steam generation in the stripper can account for approximately 20-25% of the overall heat rate. Embodiments of the system described herein can reduce the contribution from steam creation (e.g., the heat of vaporization) in the stripper by about 50% to about 80%. As a result, the overall heat rate can be reduced by about 1.0% to about 15% relative to other systems and methods.

A reduction in heat rate can be achieved by raising the chemical-solvent content of the solvent mixture used for $CO_2$ capture. While effective, this approach can result in a more corrosive solvent mixture. Further, due to the increased concentrations of ionized species in the solvent, the viscosity can also be increased, which can complicate and/or slow transport.

In an embodiment, the solvent system used in the carbon dioxide capture system or process can comprise a chemical solvent, a physical solvent, and water. General chemical solvents can include any solvents or compounds that form one or more reaction products, including carbamates or other compounds, with carbon dioxide. The chemical solvents can be regenerated through the addition of heat to release at least a portion of the carbon dioxide within the solvent system. Various chemical solvents can be used including, but not limited to, alkanolamines such as diglycolamine (DGA), monoethanolamine (MEA), 2-amino-2-methyl-1-propanol (AMP), piperazine, n-methylpiperazine, ammonia, carbonate/bicarbonate salts, alkaline solutions such as sodium and/or potassium salts with anions such a carbonates and phosphates, or any combination thereof.

The solvent system can also comprise a physical solvent. Such a physical solvent can have reduced volatility relative to water, while facilitating the formation of chemical complexes (for example, ionic complexes) during carbon dioxide absorption. Such physical solvents can also have high (e.g., greater than about 7) dielectric constants. In an embodiment, the physical solvent or solvents can have a dielectric constant greater than about 7, greater than about 10, greater than about 15, greater than about 20, greater than about 25, greater than about 30, or greater than about 35. In general, the physical solvents may have a dielectric constant that is less than about 200 or less than about 100. Suitable physical solvents having high dielectric constants can include, but are not limited to, ethylene carbonate, propylene carbonate, n-methyl-2-pyrrolidone, sulfolane, glycols (e.g., ethylene glycol, 1,3 propylene glycol, diethylene glycol, triethylene glycol, isobutylene glycol, etc.) and any mixture thereof.

In some embodiments, the physical solvent or solvents may have a relatively low molecular weight. For example, the physical solvent can have a molecular weight less than about 500 Daltons. Examples of low molecular weight physical solvents can include glycols and organic carbonates.

Exemplary physical solvents are listed in Table 1 along with their boiling points and dielectric constants (at ambient temperature).

TABLE 1

| Compound | $T_b$ (° C.) (Boiling Point) | D (Dielectric Constant) | Short-Name | CAS Registry Number |
|---|---|---|---|---|
| 1. ETHYLENE CARBONATE | 248.2 | 90.5 | EC | 96-49-1 |
| 2. PROPYLENE CARBONATE | 241.7 | 66.1 | PC | 108-32-7 |
| 3. N-METHYL-2-PYRROLIDONE | 204.3 | 32.6 | NMP | 872-50-4 |
| 4. SULFOLANE | 287.3 | 43.3 | SULF | 126-33-0 |
| 5. ETHYLENE GLYCOL | 197.3 | 41.4 | EG | 107-21-1 |
| 6. 1,3-PROPYLENE GLYCOL | 214.4 | 35.1 | PG | 504-63-2 |
| 7. DIETHYLENE GLYCOL | 244.8 | 31.8 | DEG | 111-46-6 |
| 8. TRIETHYLENE GLYCOL | 288.4 | 23.7 | TEG | 112-27-6 |
| 9. ISOBUTYLENE GLYCOL | 177.5 | 15.5 | IBG | 558-43-0 |

In some embodiments, the physical solvent can also be substantially or totally miscible with water, non-corrosive, and/or relatively non-susceptible to thermal and oxidative degradation. In some embodiments, a plurality of high dielectric constant physical solvents a mixture) can be used in combination in a solvent system.

In an embodiment, a physical solvent as described herein can be included in place of at least part of the water of the solvent system. In some embodiments, one or more physical solvent(s) can replace between about 1% and about 95% of the water. In other embodiments, one or more physical solvent(s) can replace between about 10% and about 90% of the water. In still other embodiments, one or more high dielectric constant solvent(s) replace between about 25% and about 75% of the water.

Alternatively, the amount of the physical solvent utilized can be expressed in terms of a molar ratio relative to the amount of the chemical solvent utilized in the solvent system. In an embodiment, a molar ratio of the physical solvent(s) in the solvent system to the chemical solvent(s) in the solvent system can be at least about 0.01, at least about 0.05, or at least about 0.1. In an embodiment, a molar ratio of the one or more physical solvent, in the solvent system to the chemical solvent(s) in the solvent system can be less than about 2.0, less than about 1.0, or less than about 0.5. In some embodiments, the molar ratio of the one or more physical solvent in the solvent system to the chemical solvent(s) in the solvent system can be in a range between any of the lower values to any of the upper values.

The balance of the solvent system can include water. In some embodiments, the water can comprise between about 1% and about 75% water. It can be noted that within a carbon dioxide system, the solvent system can absorb water from a flue gas, and therefore the amount of water at any point within the solvent in the system can vary. When discussed with respect to a carbon dioxide removal system, the solvent system compositions described herein generally refer to the composition of the solvent system in the lean solvent. For example, the solvent system composition as described herein can be taken as the solvent system composition at or immediately upstream of the solvent system feed to the absorber.

The use of the solvent system as described herein to absorb carbon dioxide can result in the presence of carbon dioxide in the solvent system mixture and may allow for a carbon dioxide to have a higher loading in the solvent system at absorber conditions (e.g., between about 20° C. and about 50° C., or between about 30° C. and about 45° C.) when the physical solvent is present than when it is not. The higher solubilities can include higher solubilities at both high partial pressures as well as low partial pressures (e.g., from about 0.5 to about 2 psia) of carbon dioxide. While not intending to be limited by theory, it is believed that the physical solubility of the carbon dioxide increases relative to the solubility observed in the absence of physical solvent, which in turn serves to increase the chemical solubility.

In some embodiments, the solvent system can absorb carbon dioxide. For example, the rich solvent system leaving the absorber may contain carbon dioxide. A carbon dioxide loading can be defined as the mole of carbon dioxide per mole of alkalinity in the chemical solvent (e.g., the alkaline center or functional group on the chemical solvent). For example, each mole of MEA has one N atom per molecule that serves as a one mole of alkalinity while each mole of piperazine has two moles of alkalinity due to the presence of two N atoms per molecule. In an embodiment, the carbon dioxide loading in the solvent system can be (e.g., in a rich solvent system) greater than about 0.2, greater than about 0.3, or greater than about 0.4, greater than about 0.5, greater than about 0.52, greater than about 0.54, or greater than about 0.56.

In an embodiment, the use of the solvent system described herein can be used in a carbon dioxide absorption process. A process flowsheet of an embodiment of a carbon dioxide absorption system 100 is shown in FIG. 1. As illustrated, a flue gas stream in line 102 can be fed to a blower 104, and the blown stream can pass through line 106 into a lower portion of the absorber 108. A lean solvent system can pass through line 110 into an upper portion of the absorber 108. The absorber 108 can comprise a distributor that evenly passes the solvent system over a packing or other internal structure (e.g., plates, trays, etc.) within the absorber to provide gas-liquid contact between the flue gas rising within the absorber 108 and the liquid solvent system flow down through the absorber 108. Within the absorber 108, the carbon dioxide within the flue gas can be absorbed within the solvent system such that the amount of carbon dioxide within the solvent system can increase as the solvent system flows from the upper portion to the lower portion of the absorber 108.

The rich solvent containing the absorbed carbon dioxide can pass out of the absorber 108 through rich solvent line 112. In addition to the carbon dioxide, some amount of water from the water vapor in the flue gas can be absorbed in the solvent system within the absorber 108. The water can partially dilute the solvent system in the rich solvent stream.

The flue gas having the majority of the carbon dioxide absorbed in the solvent can pass out of the absorber through line 114. A wash unit 116 can be used to contact a makeup water stream in line 118 with the flue gas in line 114. The remaining gaseous components can then pass out of the vent line 120 to another downstream unit or the atmosphere. The wash fluid, comprising mostly water, can pass through the recycle line 122 and through pump 125 before being combined with the lean solvent stream in line 126 and a blowdown stream in line 128. The combined stream can then form the lean solvent system stream in line 110 that passes to the absorber 108.

In some embodiments, an optional inter-cooler 123 can be associated with the absorber 108. In general, the absorption of carbon dioxide is exothermic and leads to an increase in the solvent system temperature within the absorber. The inter-cooler 123 may receive a stream drawn from the absorber 108, cool the stream to remove a portion of the heat generated by the absorption of the carbon dioxide, and pass the cooled stream back to the absorber 108. The presence of the physical solvent may allow for a more efficient process that can absorb a greater amount of carbon dioxide than a system using a solvent system without a physical solvent. The inter-cooler 123 may aid in providing a lower operating temperature within the absorber 108 to increase the solvent carrying capacity, which can reduce the solvent circulation rate.

The rich solvent system stream in line 112 can pass to a pump 130 before passing to a splitter 134 through line 132. Within the splitter 134, the rich solvent stream can be split into two fractions. The first fraction can include a rich solvent bypass stream in line 136 that passes directly to the stripper 142. The second portion can comprise a rich solvent stream in line 138 that passes through a cross-exchanger 140, where the rich solvent stream can be heat exchanged with the lean solvent a in line 144 from the stripper. Within the cross-exchanger 140, the portion of the rich solvent system stream in line 138 can be heated by the lean solvent stream in line 144, which can be cooled prior to passing downstream through line 126 to eventually return to the absorber 108.

In an embodiment, the system 100 comprises the cross exchanger 140 that bypasses a portion of the rich solvent in line 136 to an entry point in the stripper 142 that is above the entry point of rich solvent that passes through the cross exchanger 140 and into the stripper 142 through line 139. This configuration has been found to be advantageous when solvent systems comprising a physical solvent as described herein are used. In an embodiment, between about 1% and about 50%, alternatively between about 5% and about 35%, or alternatively between about 10% and about 25% of the rich solvent can be diverted around the cross exchanger 140 through line 136.

Within the stripper 142, the first portion of the rich solvent system in line 136 can enter at or near the top of the stripper 142, and the second portion of the rich solvent system in line 139 can enter below the first portion. The stripper can comprise a distributor or other system for introducing the rich solvent streams into an upper portion of the tower and passing the rich solvent system over a packing or other internal liquid-vapor contact structure (e.g., trays, plates, etc.). As the rich solvent passes down the stripper 142, a vaporized stream comprising released carbon dioxide and steam can pass up the stripper to remove at least a portion of the absorbed carbon dioxide and/or water.

The solvent passing down the stripper can pass out of the stripper through a bottom line 146 where the lean solvent can pass to the reboiler 148. Within the reboiler 148, the lean solvent stream is heated to produce a vapor stream comprising carbon dioxide and steam that can pass through line 150 into a lower portion of the stripper 142 and form a portion of the rising vapor phase. The liquid stream from the reboiler 148 can pass to a flash vessel 152, where the liquid can pass out of the lower portion of the flash vessel 152 as the lean solvent system. The vapor from the flash vessel 152 can pass through line 154 to a lean vapor compressor 156, which can comprise the vapor stream and pass the compressed vapor stream through line 158 back to a lower portion of the stripper 142. The compressed vapor can then form another portion of the rising vapor phase within the stripper 142.

The lean solvent system in line 160 can pass to a pump 161, which can provide a pressurized lean solvent stream in line 144 that can pass to the cross-exchanger 140. Within the cross-exchanger 140, the stream in line 144 can be heat exchanged with the second portion of the rich solvent system in line 138. The heat exchange can cool the lean solvent system stream in line 144 to provide the lean solvent system in line 126, which is then passed downstream to eventually pass to the absorber 108.

The overhead stream can pass out of the stripper 142 through line 162 and pass to condenser 164. Within the condenser 164, the less volatile components including any of the solvent system components and some amount of water can be condensed. The condenser 164 may represent one of the main contributors to the overall heat rate or energy usages in the system 100, as described in more detail herein.

The condensed stream can then pass to a flash tank 166, where the gaseous components, including carbon dioxide and potentially a minor amount of water as well as some trace amounts of the solvent system can pass out of the system as a carbon dioxide product stream through line 168. The carbon dioxide product stream can pass to any suitable downstream processing steps such as carbon dioxide injection, sequestration, purification for commercial uses, or the like.

The liquid condensate in the flash tank 166 can pass through line 170 to a pump 172. A splitter or valve 174 can be used to pass the pressurized condensate to the stripper 142 and/or a portion of the condensate can pass back to the mixer 124 for use in the absorber 108 without first passing back to the stripper 142.

The process configuration illustrated in FIG. 1 includes several elements that can result in energy savings, including when the solvent system comprising the physical solvent as described herein is used with the system 100. The overall energy requirements for the system 100 are based on a combined energy input for several components including the reboiler 148, the vapor compressor 156, and the condenser 164, in addition to minor energy requirements for each of the other motive devices and heat exchangers in the system 100. The energy requirements for the steam used in the reboiler 148 (i.e. reboiler duty) and for the vapor compressor 156 are not generally equivalent. Typically, one unit of energy required to operate the vapor compressor 156 can be equivalent to about 4 units of energy utilized in the reboiler 148. As such, the total heat rate for these units can be defined as being equivalent to the sum and the reboiler 148 duty and four times the vapor compressor 156 compression energy. Further, the condenser 164 duty can be reduced if the reboiler 148 duty is reduced based on the reduced amount of vapor passing to the condenser 164 to be condensed.

The reduction in the total system energy may be due to a number of effects including an increased solubility of the carbon dioxide within the solvent system comprising a physical solvent, a reduction in the energy requirements of the reboiler 148, and a synergistic effect between the reduction in the heat requirements in the reboiler 148 and the energy requirements in the lean vapor compressor 156.

As noted above and as depicted in FIG. 1, a first portion of the rich solvent in line 136 can be diverted from the cross exchanger 140 using a bypass, thereby transferring cooler rich solvent to the top of the stripper 142. The cooler rich solvent can reduce the vaporization of water, and the reduction in the vaporization of water is improved when at least part of the water in the solvent system is replaced by a physical solvent as described herein. In general, testing has shown that the use of a rich-solvent bypass around the cross exchanger 140 has a small effect in decreasing the reboiler 148 duty when the non-chemical solvent component is only water. Surprisingly, when a physical solvent is included within the solvent system (e.g., replacing a portion of the water), bypassing the cross exchanger 140 can reduce the total heat rate as the fraction of physical solvent in the solvent system increases.

When the solvent system described herein is used in the system 100, the reboiler 148 duty can be reduced. Even though the physical solvent used can have a relatively low dielectric constant, a larger fraction of the reduction in condenser 164 duty is gained as a reduction in reboiler 148 duty as the molar ratio of the physical solvent increases relative to chemical solvent. At the same time, the temperature of the reboiler 148 may remain relatively constant or shows only a small increase. In some embodiments, the cross-exchanger 140 duty can decrease as the relative proportion of physical solvent in the solvent system increases. Without intending to be limited by theory, it is believed that the use of physical solvents with dielectric constants close to or greater than that of water at operating temperatures may provide further improvements in the reduction of the overall energy usage.

The effects of using a physical solvent in the solvent system can also be impacted by the use of a lean vapor compressor in the system 100. In general, the use of the lean vapor compressor 156 can result in a decrease in the total heat rate for the system 100. In an embodiment, the use of the lean vapor compressor 156 can result in at least about a 5%, at least about a 10%, at least about a 15%, or at least about a 16% reduction in the total heat rate of the system 100 as compared to the use of the system 100 with a solvent system that does not contain a physical solvent.

Overall, it is expected that the use of the solvent system comprising the physical solvent can have a combined reduction in the total heat rate when compared to the use of a carbon dioxide removal system using a solvent system without a physical solvent. The reduction in the total heat rate can include a reduction in the reboiler duty greater than about 4%, greater than about 6%, or greater than about 8%. The reduction in the total heat rate can include a reduction in the power consumption by the lean vapor compressor 156 of greater than about 20%, greater than about 30%, greater than about 40%, or by about 43%. In some embodiments, the cross exchanger 140 duty can be reduced by up to about 5%, up to about 10%, up to about 15%, or up to about 18% when a physical solvent is used.

As part of the use of the solvent system comprising the physical solvent, the reboiler temperature can increase to some extent by, for example, rising between about 4° C. and about 6° C. The temperature increase can be mitigated by increasing the solvent system flow rate. For example, increasing the circulation rate of the solvent system by about 10% over a baseline rate can retain the benefit of the reduction in total heat rate while reducing the increase in reboiler temperature (e.g., having a rise of about 3° C. to about 5° C.).

EXAMPLES

The disclosure having been generally described, the following examples are given as particular embodiments of the disclosure and to demonstrate the practice and advantages thereof. It is understood that the examples are given by way of illustration and are not intended to limit the specification or the claims in any manner.

Example 1

In order to determine the effect of the substitution of at least a portion of the water in a CO2 absorbing solvent system with an alternative, physical solvent, process modeling was performed in ASPEN PLUS® (a chemical process optimization software package published by ASPEN-TECH® of Nashua, N.H.). A baseline process with the following characteristics was defined:
  35 wt % monoethanolamine
  CO2 capture from a flue gas containing 10.2 mol % CO2 and 7.9 mol % $H_2O$
  90% capture of $CO_2$ from the flue gas
  An approach temperature within the cross exchanger that is fixed at a constant, typical value of (5° C.)
  A flowsheet with absorber intercooling and a lean-vapor compressor, which follows the system illustrated in FIG. 1.
  A solvent flow rate set such that the solvent molar circulation divided by the mole rate of CO2 capture is fixed at a constant, representative value.

An initial model was run with a base solvent system comprising monoethanolamine (MEA) and water. A second model was then run in which solvent modifications were made to this baseline process that substituted triethylene glycol (TEG) for a portion of the water while maintaining the MEA at 35 wt %. Studies were also performed in which the solvent molar circulation rate was increased above this typical value by 10%. In some implementations the system was configured with a bypass around the cross exchanger to determine the effects of the use of the bypass system. Additional studies were performed in which the solvent molar circulation divided by the mole rate of $CO_2$ capture was increased by 10% over the baseline value.

Figure 2:
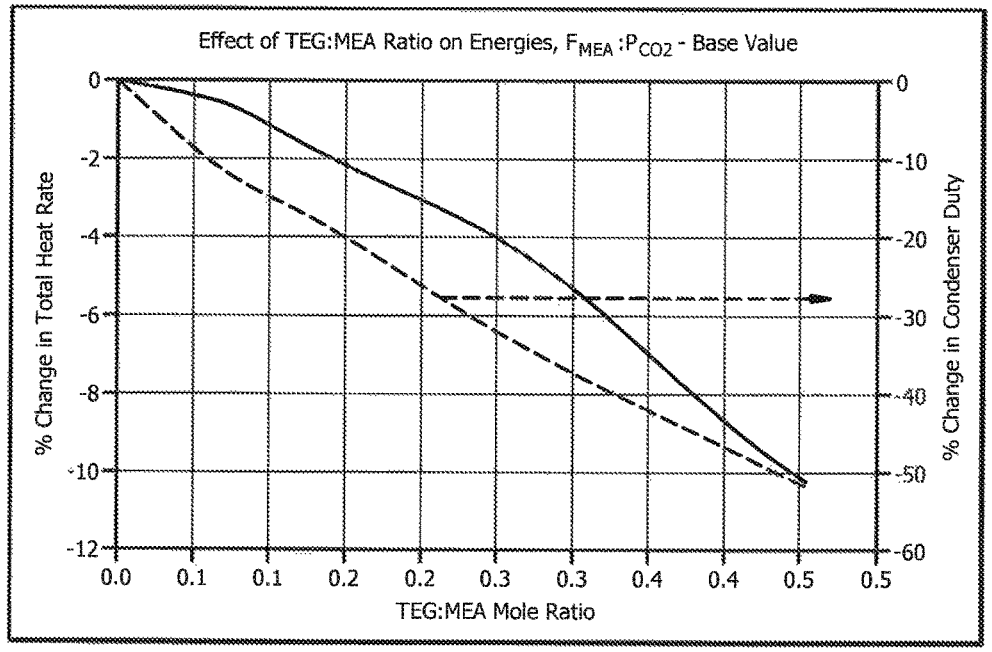
FIG. 2 illustrates the effect of the molar ratio of the TEG:MEA on the total heat rate and on the condenser duty according to an embodiment.

Results for model comparisons are shown in FIGS. 2 to 6. FIG. 2 illustrates the effect of the molar ratio of the TEG:MEA (where the TEG is the physical solvent) on the total heat rate and on the condenser duty. The ratio of MEA circulation rate to the carbon dioxide production rate ($F_{MEA}$:$P_{CO2}$) is fixed at a typical baseline value in the model.

Figure 3:
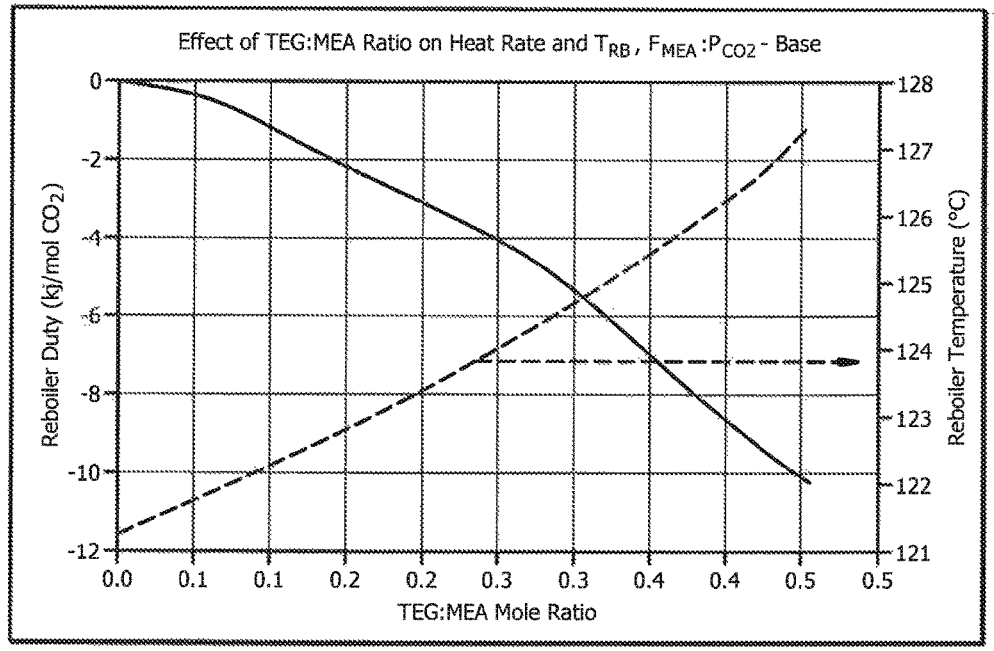
FIG. 3 illustrates the effect of the molar ratio of the TEG:MEA on the total ea rate and on the reboiler temperature according to an embodiment.

FIG. 3 illustrates the effect of the molar ratio of the TEG:MEA on the total heat rate and on the reboiler temperature. The ratio of the MEA circulation rate to the carbon dioxide production rate ($F_{MEA}$:$P_{CO2}$) is fixed at a typical baseline value in the model.

Figure 4:
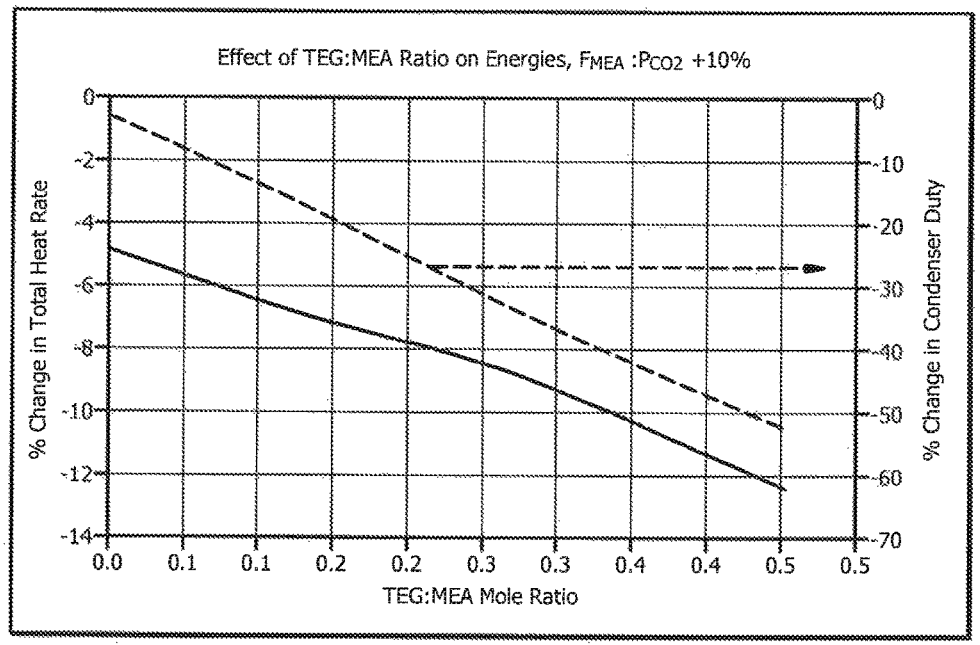
FIG. 4 illustrates the effect of the molar ratio of the TEG:MEA on the total heat rate and on the condenser duty according to an embodiment.

FIG. 4 illustrates the effect of the molar ratio of the TEG:MEA on the total heat rate and on the condenser duty. The ratio of the MEA circulation rate to the carbon dioxide production rate ($F_{MEA}$:$P_{CO2}$) is increased by 10% over the baseline value of FIG. 2.

Figure 5:
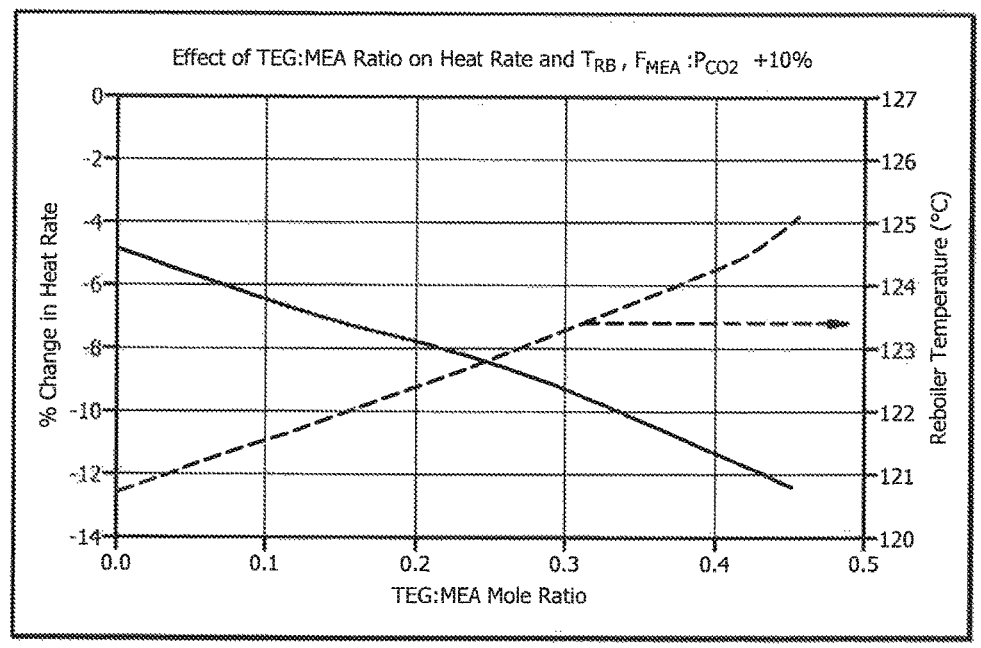
FIG. 5 illustrates the effect of the molar ratio of the TEG:MEA on the total heat rate and on the reboiler temperature according to an embodiment.

FIG. 5 illustrates the effect of the molar ratio of the TEG:MEA on the total heat rate and on the reboiler temperature. The ratio of the MEA circulation rate to the carbon dioxide production rate ($F_{MEA}$:$P_{CO2}$) is increased by 10% over the baseline value of FIG. 3.

Figure 6:
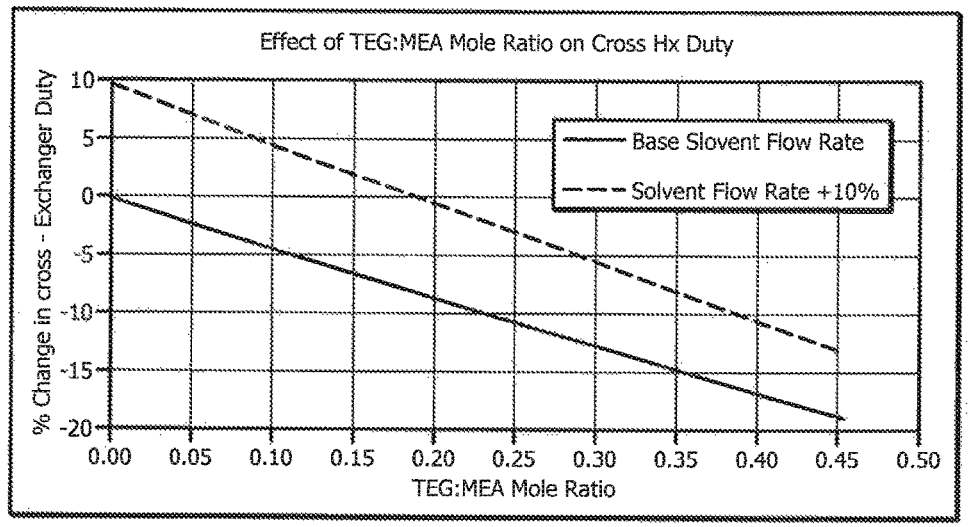
FIG. 6 illustrates the effect of the molar ratio of the TEG:MEA on the cross-exchanger heat duty at different MEA circulation rates according to an embodiment.

FIG. 6 illustrates the effect of the molar ratio of the TEG:MEA on the cross-exchanger heat duty at different MEA circulation rates.

Surprisingly, even though the alternative solvent used (TEG) has a relatively low dielectric constant, the results are significantly favorable, as a larger fraction of the reduction in condenser duty is gained as a reduction in reboiler duty as the molar ratio of the high dielectric solvent (in this case TEG) is increased relative to MEA. At the same time, the reboiler temperature remains relatively constant or shows only a small increase. Similarly, as shown in FIG. 6, cross heat exchanger duty decreases as the relative proportion of physical solvent (in this instance TEG) increases.

Example 2

An additional set of models were conducted under the parameters described in Example 1, with the exception that the physical solvent was sulfolane. At the start of this study, it was expected that replacing a portion of the water in the solvent by sulfolane would reduce the heat rate of the process. In the course of the study, it was found that a cross-exchanger bypass is also beneficial in reducing the heat rate.

Figure 7:
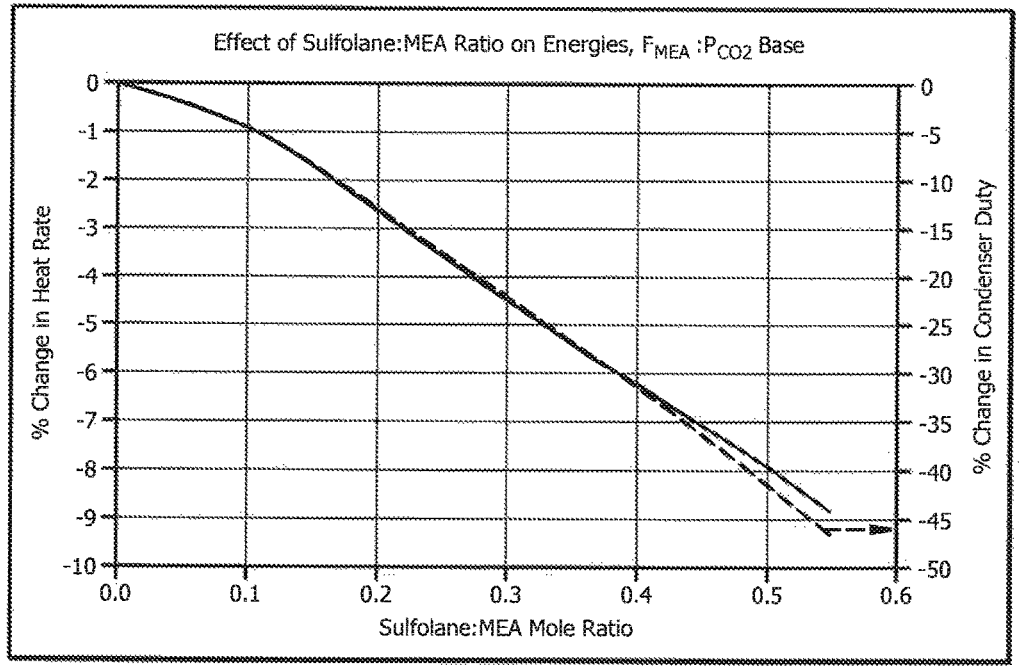
FIG. 7 illustrates the effect of the molar ratio of sulfolane: MEA on the total heat rate and on condenser duty according to an embodiment.

FIG. 7 illustrates the effect of the molar ratio of sulfolane: MEA on the total heat rate and on condenser duty. The ratio of the MEA circulation rate to the CO2 production rate ($F_{MEA}$:$P_{CO2}$) is fixed at a typical value in FIG. 7.

Figure 8:
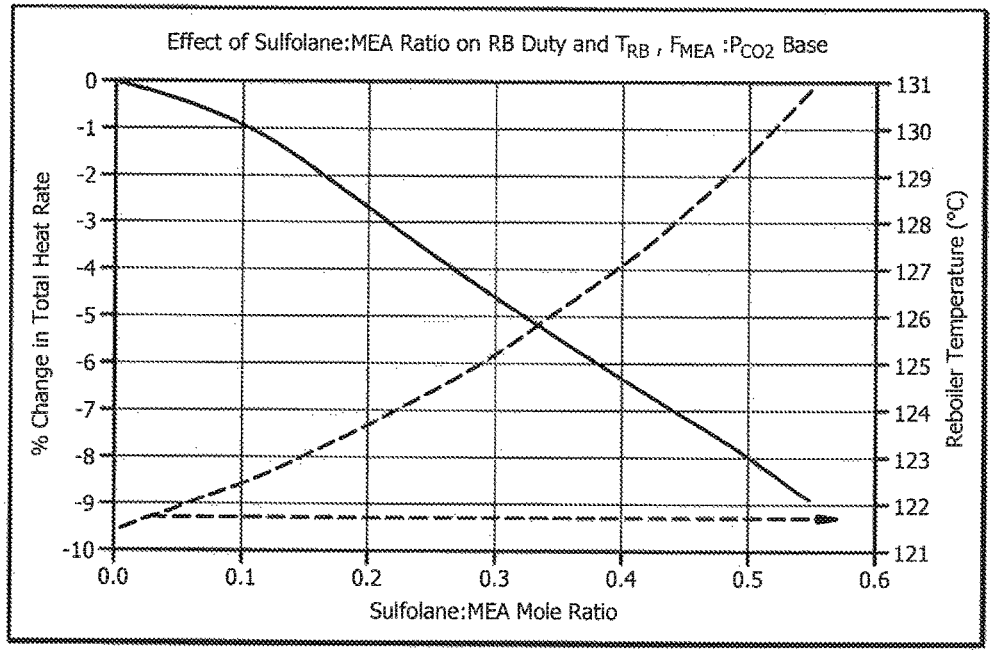
FIG. 8 illustrates the effect of the molar ratio of sulfolane: MEA on the total heat rate and on the reboiler temperature according to an embodiment.

FIG. 8 illustrates the effect of the molar ratio of sulfolane: MEA on the total heat rate and on the reboiler temperature.

The ratio of the MEA circulation rate to the $CO_2$ production rate ($F_{MEA}$:$P_{CO2}$) is fixed at a typical value in FIG. 8.

Replacement of water with sulfolane, as shown in FIGS. 7 and 8, was found to produce results for $CO_2$ absorption that are similar to those observed for replacement of water by TEG. TEG and sulfolane, as representative high dielectric physical solvents, were both effective in reducing the total heat rate.

Figure 9:
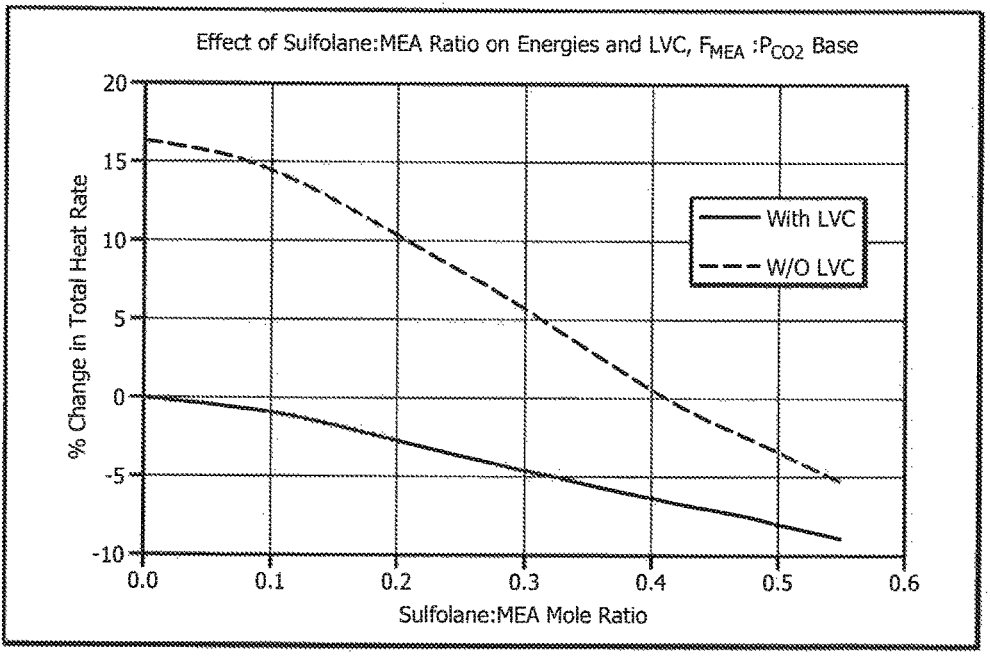
FIG. 9, illustrates the effect of the molar ratio of sulfolane: MEA on the total heat rate in the presence and absence of a lean vapor compressor according to an embodiment.

The effects of sulfolane substitution for at least a portion of the water in carbon dioxide capture solvent system have also been evaluated in terms of the impact on the use of a lean vapor compressor in a system or process of the inventive concept. Results of these studies are shown in FIG. 9, illustrates the effect of the molar ratio of sulfolane:MEA on the total heat rate in the presence and absence of a lean vapor compressor. The ratio of the MEA circulation rate to the $CO_2$ production rate ($F_{MEA}$:$P_{CO2}$) is fixed at a typical value in FIG. 9. As can be seen, the removal of the lean vapor compressor can result in an approximately 16% increase in the total heat rate when a solvent system not having a physical solvent is used. In either the presence of absence of a lean vapor compressor, however, the replacement of at least a portion of the water in the solvent system with a physical solvent can reduce the total heat rate.

The studies with sulfolane in the Solvent system indicated that replacing at least a portion of the water in the solvent system with sulfolane (e.g., a physical solvent) can provide a reduction in the total heat rate by reducing the reboiler duty by about 8% and reducing the power requirements for the lean vapor compressor by about 25%.

Figure 10:
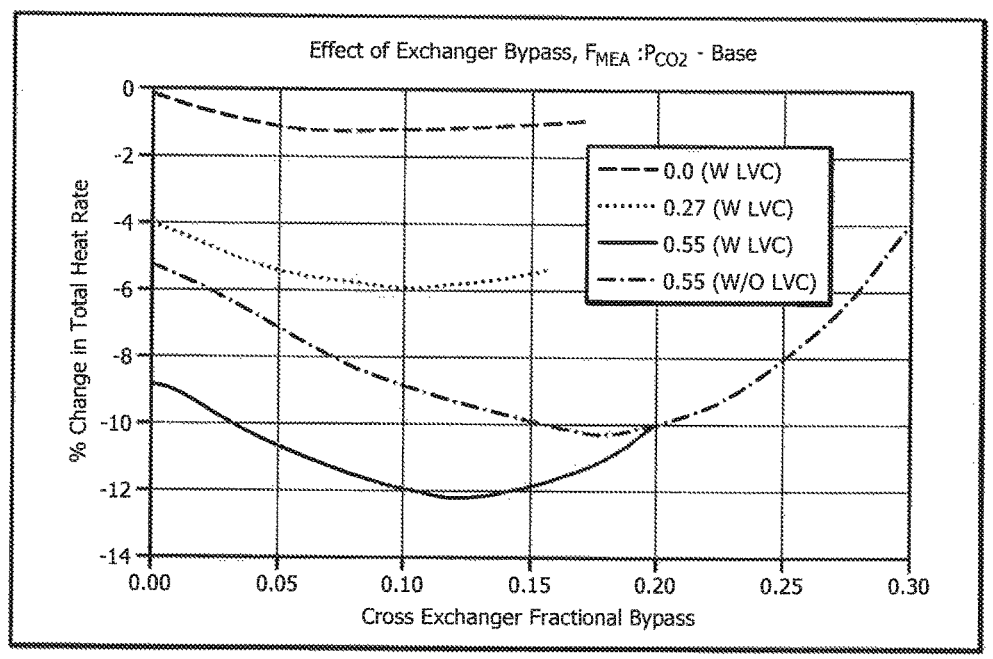
FIG. 10 illustrates the effect of bypassing a portion of the rich solvent flow through the cross-exchanger, both with and without the use of the lean vapor compressor according to an embodiment.

Studies for using the cross-exchanger bypass were also performed with sulfolane. FIG. 10 illustrates the effect of bypassing a portion of the rich solvent flow through the cross-exchanger, both with and without the use of the lean vapor compressor. As demonstrated by FIG. 11, the effect of using the cross-exchanger bypass can be greater when the solvent system comprises the physical solvent. The solvent system containing sulfolane as the physical solvent has been modeled with varying fractions of the rich solvent bypassing the cross-exchanger. The use of a rich solvent bypass of the cross-exchanger has a minimal effect in reducing the reboiler duty when the non-chemical solvent component is pure water. Surprisingly, when a physical solvent such as sulfolane replaces a portion of the water, however, bypassing the cross exchanger can reduce the total heat rate as the fraction of the physical solvent increases.

Having described various systems and methods, various embodiments can include, but are not limited to:

In a first embodiment, a solvent system for capture of carbon dioxide from a gas mixture comprises a chemical solvent in a concentration ranging from 20 wt % to 50 wt %; a nonaqueous physical solvent, where a molar ratio of the nonaqueous physical solvent to the chemical solvent is between about 0.01 to 0.7; and water.

A second embodiment can include the solvent system of the first embodiment, wherein the chemical solvent is selected from the group consisting of an alkanolamine and an alkaline carbonate.

A third embodiment can include the solvent system of the first embodiment, wherein the chemical solvent comprises an alkanolamine, and wherein the alkanolamine is selected from the group consisting of monoethanolamine (MEA), 2-amine-2-methyl-1 propanol (AMP), diglycolamine (DGA), piperazine, n-methylpiperazine, ammonia, and combinations thereof.

A fourth embodiment can include the solvent system of any of the first to third embodiments, wherein the nonaqueous physical solvent has a dielectric constant greater than 7.

A fifth embodiment can include the solvent system of the fourth embodiment, wherein the nonaqueous physical solvent has a dielectric constant greater than or equal to 15.

A sixth embodiment can include the solvent system of any of the first to fifth embodiments, wherein the nonaqueous physical solvent is selected from the group consisting of ethylene carbonate, propylene carbonate, n-methyl-2-pyrrolidone, sulfolane, ethylene glycol, 1,3-propylene glycol, diethylene glycol, triethylene glycol, sulfolane, N-methyl-2-pyrrolidone, isobutylene glycol, and combinations thereof.

A seventh embodiment can include the solvent system of any of the first to sixth embodiments, wherein the nonaqueous physical solvent a dielectric constant that is greater than that of water at an operating temperature in which the solvent is in use.

An eighth embodiment can include the solvent system of any of the first to seventh embodiments, wherein a carbon dioxide loading in the solvent system is greater than about 0.4.

In a ninth embodiment, a method for capturing carbon dioxide from a gas mixture comprises contacting a gaseous stream comprising carbon dioxide with a lean solvent system, wherein the solvent system comprises a chemical solvent, a physical solvent, and water; absorbing at least a portion of the carbon dioxide in the lean solvent system to produce a rich solvent system; transferring the rich solvent system to a stripper, where the stripper comprises a reboiler; applying heat to the rich solvent system using the reboiler; generating a vapor stream within the reboiler while incurring a heat rate to regenerate the lean solvent system, wherein the vapor stream comprises steam and at least a portion of the carbon dioxide from the rich solvent system; and transferring the vapor stream to a condenser.

A tenth embodiment can include the method of the ninth embodiment, wherein a heat duty of the condenser is reduced relative to a corresponding method in which the solvent system does not include the physical solvent, and reducing a heat duty of the reboiler relative to a corresponding process in which the solvent system does not include the physical solvent.

An eleventh embodiment can include the method of the ninth or tenth embodiment, wherein the heat rate of the method is reduced by at least 10% relative to a corresponding process in which the solvent system does not include the physical solvent.

A twelfth embodiment can include the method of any of the ninth to eleventh embodiments, wherein a first portion of the rich solvent is transferred to the stripper without passing through a cross exchanger, and wherein a second portion of the rich solvent system is transferred through the cross exchanger prior to transfer to the stripper.

A thirteenth embodiment can include the method of the twelfth embodiment, wherein the first portion of the rich solvent enters the stripper above where the second portion enters the stripper.

A fourteenth embodiment can include the method of any of the ninth to thirteenth embodiments, further comprising: compressing the vapor stream from the reboiler; and reintroducing the compressed lean vapor to the stripper.

In a fifteenth embodiment, a system for carbon dioxide capture from a gas mixture comprises: an absorber, wherein the absorber is configured to receive a lean solvent system and gaseous stream comprising carbon dioxide, contact the lean solvent system with the gaseous stream, and produce a rich solvent system stream and a gaseous stream depleted in carbon dioxide; a stripper, wherein the stripper is configured to receive the rich solvent system; a cross-exchanger in fluid communication with a rich solvent system outlet on the absorber and a rich solvent system inlet on the stripper; a splitter, wherein the splitter is configured to separate the rich solvent system stream into a first portion and a second portion, wherein the splitter is configured to direct the first portion directly to the stripper and the second portion through the cross-exchanger prior to passing to the stripper; a reboiler in fluid communication with a lower portion of the stripper, wherein the reboiler is configured to generate a vapor stream from the rich solvent system and pass the vapor stream back to the stripper; and a condenser in fluid communication with a vapor outlet of the stripper.

A sixteenth embodiment can include the system of the fifteenth embodiment, wherein the stripper comprises a plurality of rich solvent system inlets, wherein the first portion of the rich solvent system stream is configured to enter the stripper through a first inlet of the plurality of rich solvent system inlets, and where the second portion of the rich solvent system stream is configured to enter the stripper through a second inlet of the plurality of rich solvent system inlets.

An seventeenth embodiment can include the system of the sixteenth embodiment, wherein the first inlet is above the second inlet.

A eighteenth embodiment can include the system of any of the fifteenth to seventeenth embodiments, further comprising: a flash tank in fluid communication with the reboiler, wherein the flash tank is configured to receive an outlet stream from the reboiler and generate the lean solvent system stream and a lean vapor stream; and a lean vapor compressor in fluid communication with the flash tank, wherein the lean vapor compressor is configured to receive and compress the lean vapor stream and pass the compressed lean vapor stream back to the stripper.

A nineteenth embodiment can include the system of any of the fifteenth to eighteenth embodiments, further comprising: an intercooler comprising a heat exchanger, a fluid inlet, and a fluid outlet, wherein the fluid inlet and the fluid outlet are in fluid communication with the absorber, and wherein the intercooler is configured to receive a stream from the absorber through the fluid inlet, cool the stream, and return the cooled fluid stream to the absorber through the fluid outlet.

A twentieth embodiment can include the system of any of the fifteenth to nineteenth embodiments, wherein the lean solvent system comprises a chemical solvent, a nonaqueous physical solvent, and water.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification, and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as "comprises," "includes," and "having" should be understood to provide support for narrower terms such as "consisting of," "consisting essentially of," and "comprised substantially of" Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for capturing carbon dioxide from a gas mixture comprising:
    contacting a gaseous stream comprising carbon dioxide with a lean solvent system, wherein the lean solvent system comprises a chemical solvent, a physical solvent, and water;
    absorbing at least a portion of the carbon dioxide in the lean solvent system to produce a rich solvent system;
    transferring the rich solvent system to a stripper, wherein the stripper comprises a reboiler;
    applying heat to the rich solvent system using the reboiler;
    generating a first vapor stream within the reboiler while incurring a heat rate to regenerate the lean solvent system, wherein the first vapor stream comprises steam and at least a portion of the carbon dioxide from the rich solvent system;
    passing a liquid stream from the reboiler to a flash vessel;
    producing, in the flash vessel, a second vapor stream and the lean solvent system;
    compressing the second vapor stream in a lean vapor compressor to produce a compressed lean vapor stream;
    passing the compressed lean vapor stream to the stripper; and
    transferring an overhead stream from the stripper to a condenser.

2. The method of claim 1, wherein a heat duty of the condenser is reduced relative to a corresponding method in which the solvent system does not include the physical solvent, and reducing a heat duty of the reboiler relative to a corresponding process in which the solvent system does not include the physical solvent.

3. The method of claim 1, wherein the heat rate of the method is reduced by at least 10% relative to a corresponding process in which the solvent system does not include the physical solvent.

4. The method of claim 1, further comprising:
    splitting the rich solvent into a first portion and a second portion;
    transferring the first portion of the rich solvent to the stripper without passing through a cross exchanger; and
    transferring the second portion of the rich solvent system through the cross exchanger prior to transferring the second portion to the stripper.

5. The method of claim 4, wherein the first portion of the rich solvent enters the stripper above where the second portion enters the stripper.

6. The method of claim 1, wherein absorbing at least the portion of the carbon dioxide in the lean solvent system occurs in an absorber, wherein an intercooler is in fluid communication with the absorber, and wherein the intercooler comprises a heat comprises exchanger, a fluid inlet, and a fluid outlet, wherein the method further comprises:
    receiving a side stream from the absorber through the fluid inlet;
    cooling the side stream in the heat exchanger; and
    returning the cooled side stream to the absorber through the fluid outlet of the intercooler.

7. The method of claim 1, wherein the lean solvent system comprises:
    the chemical solvent in a concentration ranging from 20 wt % to 50 wt %,
    wherein the physical solvent is a nonaqueous physical solvent, and where a molar ratio of the nonaqueous physical solvent to the chemical solvent is between about 0.01 to 0.7.

8. The method of claim 7, wherein the nonaqueous physical solvent is selected from a group consisting of ethylene carbonate, propylene carbonate, n-methyl-2-pyrrolidone, sulfolane, ethylene glycol, 1,3-propylene glycol, diethylene glycol, triethylene glycol, sulfolane, N-methyl-2-pyrrolidone, isobutylene glycol, and combinations thereof.

9. The method of claim 7, wherein the nonaqueous physical solvent has a dielectric constant that is greater than that of water at an operating temperature in which the solvent is in use.

10. The method of claim 7, wherein a carbon dioxide loading in the solvent system is greater than about 0.4.

11. The method of claim 7, wherein the chemical solvent is selected from a group consisting of an alkanolamine and an alkaline carbonate.

12. The method of claim 7, wherein the chemical solvent comprises an alkanolamine, and wherein the alkanolamine is selected from a group consisting of monoethanolamine A (MEA), 2-amine-2-methyl-1 propanol (AMP), diglycolamine (DGA), and combinations thereof.

13. The method of claim 7, wherein the nonaqueous physical solvent has a dielectric constant greater than 7.

14. The method of claim 13, wherein the nonaqueous physical solvent has a dielectric constant greater than or equal to 15.

15. A method for capturing carbon dioxide from a gas mixture comprising:
    providing a rich solvent to a stripper;
    applying heat to the rich solvent system using a reboiler;
    generating a first vapor stream within the reboiler while incurring a heat rate to regenerate a lean solvent system, wherein the first vapor stream comprises steam and at least a portion of the carbon dioxide from the rich solvent system;
    passing a liquid stream from the reboiler to a flash vessel;
    producing, in the flash vessel, a second vapor stream and the lean solvent system;
    compressing the second vapor stream in a lean vapor compressor to produce a compressed lean vapor stream; and
    passing the compressed lean vapor stream to the stripper;
    wherein providing a rich solvent to a stripper comprises: contacting a gaseous stream comprising carbon dioxide with the lean solvent system, wherein the lean solvent system comprises a chemical solvent, a physical solvent, and water, where a molar ratio of the physical solvent to the chemical solvent is between about 0.01 to 0.7, and wherein the physical solvent has a dielectric constant greater than 7; absorbing at least a portion of the carbon dioxide in the lean solvent system to produce the rich solvent system; and transferring the rich solvent system to the stripper, wherein the stripper comprises the reboiler.

16. The method of claim 15, further comprising transferring an overhead stream from the stripper to a condenser; wherein a heat duty of the condenser is reduced relative to a corresponding method in which the solvent system does not include the physical solvent, and reducing a heat duty of the reboiler relative to a corresponding process in which the solvent system does not include the physical solvent.

17. The method of claim 15, further comprising:
    splitting the rich solvent into a first portion and a second portion;
    transferring the first portion of the rich solvent to the stripper without passing through a cross exchanger; and transferring the second portion of the rich solvent system through the cross exchanger prior to transferring the second portion to the stripper.

18. The method of claim 17, wherein the first portion of the rich solvent enters the stripper above where the second portion enters the stripper.

19. The method of claim 17, wherein absorbing at least the portion of the carbon dioxide in the lean solvent system occurs in an absorber, wherein an intercooler is in fluid communication with the absorber, and wherein the intercooler comprises a heat exchanger, a fluid inlet, and a fluid outlet, wherein the method further comprises:
- receiving a side stream from the absorber through the fluid inlet;
- cooling the side stream in the heat exchanger, and
- returning the cooled side stream to the absorber through the fluid outlet of the intercooler.

\* \* \* \* \*

UNITED STATES PATENT AND TRADEMARK OFFICE
CERTIFICATE OF CORRECTION

PATENT NO. : 10,005,027 B2
APPLICATION NO. : 15/008964
DATED : June 26, 2018
INVENTOR(S) : Paul M. Mathias et al.

Page 1 of 1

It is certified that error appears in the above-identified patent and that said Letters Patent is hereby corrected as shown below:

On the Title Page

Item [73], Replace "Corporaticn" with ---Corporation---

Signed and Sealed this
Seventh Day of May, 2019

Andrei Iancu
*Director of the United States Patent and Trademark Office*